United States Patent
Saitoh et al.

(10) Patent No.: US 6,272,242 B1
(45) Date of Patent: *Aug. 7, 2001

(54) CHARACTER RECOGNITION METHOD AND APPARATUS WHICH GROUPS SIMILAR CHARACTER PATTERNS

(75) Inventors: Takashi Saitoh; Kazunori Takatsu, both of Yokohama (JP)

(73) Assignee: Ricoh Company, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/501,924

(22) Filed: Jul. 13, 1995

(30) Foreign Application Priority Data

Jul. 15, 1994 (JP) .................................... 6-164086

(51) Int. Cl.⁷ ...................................................... G06K 9/00
(52) U.S. Cl. ............................................. 382/187; 704/10
(58) Field of Search .................................. 382/224, 225, 382/226, 228, 229, 230, 196, 186, 181, 187, 238, 308, 309, 310, 100, 203, 231, 290, 292, 161, 170, 218; 707/500, 542; 358/470; 704/8–10

(56) References Cited

U.S. PATENT DOCUMENTS

| 5,075,896 | * | 12/1991 | Wilcox et al. | 382/225 |
|---|---|---|---|---|
| 5,187,751 | * | 2/1993 | Tanaka | 382/224 |
| 5,237,628 | * | 8/1993 | Levitan | 382/317 |
| 5,239,594 | * | 8/1993 | Yoda | 382/155 |
| 5,497,432 | * | 3/1996 | Nishida | 382/186 |
| 5,526,447 | * | 6/1996 | Shepard | 382/311 |
| 5,596,657 | * | 1/1997 | Choi | 382/227 |
| 5,852,685 | * | 12/1998 | Shepard | 382/311 |
| 5,875,263 | * | 2/1999 | Froessl | 382/181 |
| 5,881,172 | * | 3/1999 | Pintsov | 382/227 |

* cited by examiner

*Primary Examiner*—Jayanti K. Patel
(74) *Attorney, Agent, or Firm*—Oblon, Spivak, McClelland, Maier & Neustadt, P.C.

(57) ABSTRACT

A character recognition method and apparatus which assembles similar character patterns into groups. By performing character recognition for each character of the group and comparing the recognition results for the group, a single recognition result can be obtained for the entire group which is quite accurate. Alternatively, a representative pattern may be generated for the group and a single recognition processing performed on this pattern in order to reduce the amount of time necessary to perform the character recognition process. When the result of the character recognition does not strongly indicate a single recognition result, the probability of appearance of individual characters and/or groups of characters such as digrams or trigrams can be analyzed to obtain more accurate results.

25 Claims, 11 Drawing Sheets

CHARACTER CODE NOMINEES

| | h | b | a | H | ... |
|---|---|---|---|---|---|
|  | <u>0.6</u> | 0.4 | 0.1 | 0.2 | ... |
| PATTERNS WITHIN GROUP  | 0.6 | <u>0.7</u> | 0.1 | 0.1 | ... |
|  | <u>0.8</u> | 0.3 | 0.05 | 0.1 | ... |
| TOTALS | <u>2.0</u> | 1.4 | 0.25 | 0.4 | |

| LETTER | PROB.(%) | DIGRAM | PROB.(%) | TRIGRAM | PROB.(%) |
|---|---|---|---|---|---|
| * | 17.41 | e* | 3.05 | *th | 1.62 |
| e | 9.76 | *t | 2.40 | the | 1.36 |
| t | 7.01 | th | 2.03 | he* | 1.32 |
| a | 6.15 | he | 1.97 | *of | 0.63 |
| o | 5.90 | *a | 1.75 | of* | 0.60 |
| i | 5.51 | s* | 1.75 | ed* | 0.60 |
| n | 5.50 | d* | 1.56 | *an | 0.59 |
| s | 4.97 | in | 1.44 | nd* | 0.57 |
| r | 4.74 | t* | 1.38 | and | 0.55 |
| h | 4.15 | n* | 1.28 | *in | 0.51 |
| j | 3.19 | er | 1.26 | ing | 0.50 |
| d | 3.05 | an | 1.18 | *to | 0.50 |
| c | 2.30 | *o | 1.14 | to* | 0.46 |
| u | 2.10 | re | 1.10 | ng* | 0.44 |
| m | 1.87 | on | 1.00 | er* | 0.39 |
| f | 1.76 | *s | 0.99 | in* | 0.38 |
| p | 1.50 | ,* | 0.96 | is* | 0.37 |
| g | 1.47 | *i | 0.93 | ion | 0.36 |
| w | 1.38 | *w | 0.92 | *a* | 0.36 |
| y | 1.33 | at | 0.87 | on* | 0.35 |
| b | 1.10 | en | 0.86 | as* | 0.33 |
| , | 0.98 | r* | 0.83 | *co | 0.32 |
| . | 0.83 | y* | 0.82 | re* | 0.32 |
| v | 0.77 | nd | 0.81 | at* | 0.31 |
| k | 0.49 | .* | 0.81 | ent | 0.30 |
| T | 0.30 | *h | 0.78 | e*t | 0.30 |
| " | 0.29 | ed | 0.77 | tio | 0.29 |

*FIG. 6*

| CHARACTER PATTERN LINE | a | b | c | d | e | a | b | f | c | d | g | h | i | j |
|---|---|---|---|---|---|---|---|---|---|---|---|---|---|---|
| SYMBOL SERIES | $S_1$ | $S_2$ | $S_3$ | $S_4$ | $S_5$ | $S_1$ | $S_2$ | $S_6$ | $S_3$ | $S_4$ | $S_7$ | $S_8$ | $S_9$ | $S_{10}$ |
| SYMBOL PAIR | | | | | | | | | | | | | | |
| $S_1\ S_2$ | ab | | | | | ab | | | | | | | | |
| $S_2\ S_3$ | | bc | | | | | | | | | | | | |
| $S_3\ S_4$ | | | cd | | | | | | cd | | | | | |
| · | | | | | | | | | | | | | | |
| · | | | | | | | | | | | | | | |
| · | | | | | | | | | | | | | | |

*FIG. 9*

CHARACTER RECOGNITION METHOD AND APPARATUS WHICH GROUPS SIMILAR CHARACTER PATTERNS

BACKGROUND OF THE INVENTION

1. Field of the Invention

This invention relates to the field of document image processing systems, and more particularly relates to optical character recognition (OCR) systems. The invention further relates to a method and system which groups similar character patterns when performing the character recognition process.

2. Discussion of the Background

Conventional OCR systems extract features from each character pattern. A pattern matching process is performed using the extracted character patterns and a recognition dictionary containing reference information. Differences between sizes of the characters, the type of fonts used, and noise included in the original image often affect the performance of OCR systems.

A typical image on which character recognition is performed includes alphabetic and numeric patterns which are used many times. The same character should be represented by the same bit-mapped image but in reality, there are some differences attributable to noise including quantization error or sampling (scanning) error. Further, the recognition process performed on each character pattern is complicated and time consuming, as demonstrated by known character recognition systems such as the publication "On the Recognition of Printed Characters of Any Font and Size," IEEE Transactions on Pattern Analysis and Machine Intelligence, Vol. PAMI-9, No. 2, March 1987, by Simon Kahan et al, pp. 274–288, which is incorporated herein by reference.

SUMMARY OF THE INVENTION

Accordingly, it is an object of the invention to use a grouping of similar character patterns to achieve an efficient and accurate character recognition process. It is a further object of the invention to use a grouping of similar character patterns to achieve a character recognition process which is more accurate and/or faster than character recognition processes which do not use character grouping.

It is another object of the invention to use a probability of appearance of a letter, in addition to using pattern grouping, in order to obtain a more accurate result.

It is yet another object of the invention to use a probability of appearance of n-grams (e.g., consecutive characters such as a digram or trigram) in order to achieve a more accurate recognition result.

These and other objects are accomplished by a novel character recognition process and apparatus which performs a grouping of similar character patterns. According to one embodiment, similar character patterns are grouped and a character recognition process is performed for every character which is a member of the group. Then the results of the character recognition process are analyzed and a single character code is assigned to each character pattern of the group based on the recognition result of each character. This process allows accurate recognition results to be obtained based on the accuracy of the grouping, even if the character recognition process for a specific member of the group does not result in an accurate recognition determination.

As an alternative to the above process, after the similar character patterns are placed into groups, a representative pattern is generated for each group. Then a character recognition process is performed on each representative pattern in order to obtain a recognition result. This recognition process results in especially fast processing, as compared to conventional methods of performing character recognition for an image.

It is possible that some representative patterns of groups which are generated may not result in a clear character recognition answer but there may be a plurality of character recognition results which may have a similar probability of being accurate. In cases where there is not a clear choice for the character recognition result, the probability of occurrence of each of the possible character recognition results is compared to characteristics of typical documents. For example, there are known probability tables for the appearance of characters within writings. These probability tables can be used along with the grouping process to obtain more accurate results. Also, there are known probabilities of the appearances of n-grams which are consecutive letters. Two consecutive letters are called a digram and three consecutive letters are called a trigram, etc. Using these probabilities of digrams, trigrams, or other n-grams, it is possible to obtain more accurate recognition results.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 6 illustrates the probability of appearance of selected letters, digrams, and trigrams in a typical English language document;

FIG. 9 illustrates an example of how digrams are extracted from a document.

DESCRIPTION OF THE PREFERRED EMBODIMENTS

Figure 1:
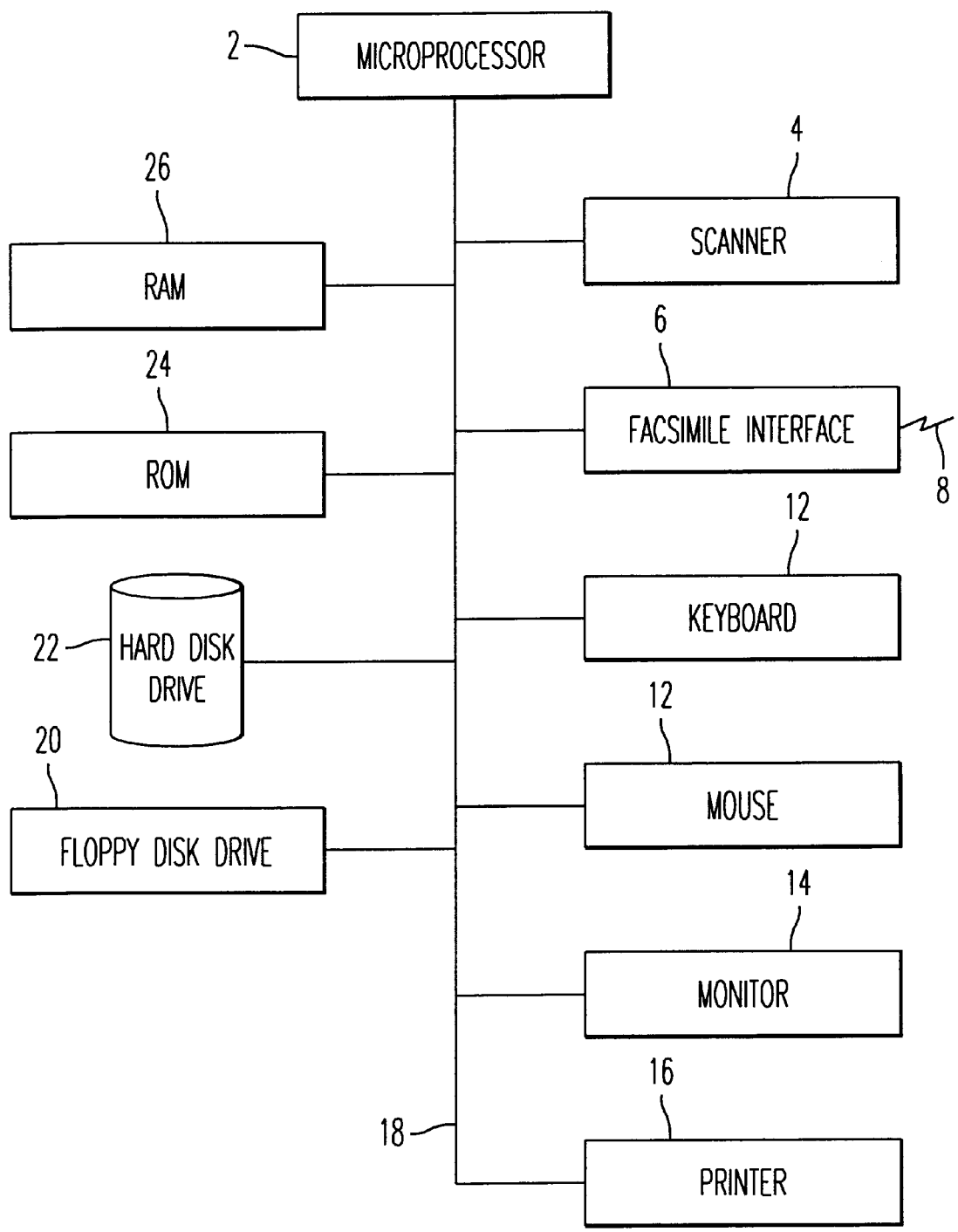
FIG. 1 is a hardware diagram of a device used to perform the character recognition process.

Referring now to the drawings, wherein like reference numerals designate identical or corresponding parts throughout the several views, and more particularly to FIG. 1 thereof, there is illustrated the hardware which is used to perform the character recognition process of the present invention. Included in FIG. 1 is a microprocessor 2 which controls the illustrated system and performs the character recognition functions of the invention. The microprocessor 2 may, for example, be any microprocessor manufactured by Intel, Motorola, or any other microprocessor manufacturer. A scanner 4 is a device used to input an image on which the character recognition process is performed. The illustrated scanner employs in a known manner, a charge coupled device (CCD) to detect the image and a light to illuminate the image being scanned. The system illustrated in FIG. 1 also includes a facsimile interface 6 connected to a telephone or ISDN line 8. As conventional facsimile machines transmit images, the image on which the character recognition process is performed may be obtained through the facsimile interface 6. Any other manner of obtaining an image may also be used.

The system of FIG. 1 further includes conventional input and output elements such as a keyboard 10, a mouse 12 or any other type of pointing device, and a monitor 14 which can be a conventional CRT, a LCD, a pressure sensitive screen, or any other type of monitor and is used for displaying the input image, the recognition results, or other information. A printer 16 is used to print out the input image or to output the results of the character recognition process (e.g., a document made up of character codes. The printer 16 can be implemented using any type of printing mechanism including a laser printer, an inkjet printer, or a dot matrix printer. There is a system bus 18 connecting each of the components of the system.

In FIG. 1, there is also a floppy disk drive 20 and a hard disk drive 22. A ROM 24 may be used to store a process executed by the microprocessor 2 or a computer program executing the optical character recognition process. The hard disk drive 22 may alternatively store the optical character recognition process. The floppy disk drive 20 may be used to input the image on which the character recognition process is performed. The output of the character recognition process may be stored in the hard disk drive 22 or the floppy disk drive 20. A RAM 26 is used in a conventional manner during execution of the character recognition process and can store the results of the character recognition process.

The system of FIG. 1 may be implemented in any type of computer including an IBM personal computer or a Macintosh computer. The system may also be implemented in a Unix based system, a digital copier, any type of office device, or any hardware capable of performing the described character recognition process. The system illustrated in FIG. 1 processes signals representing images and transforms those signals to be a document or page represented by character codes.

Figure 2:
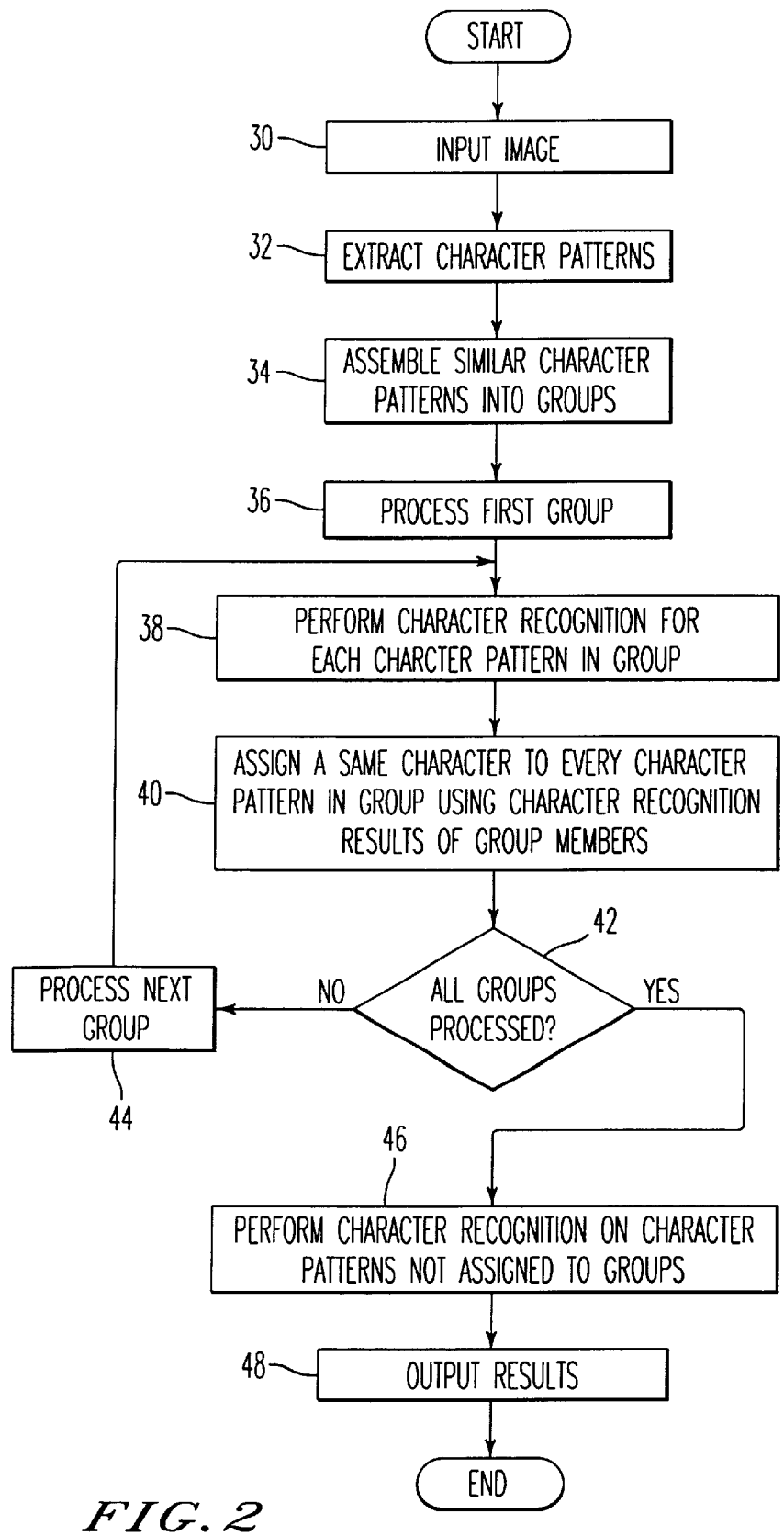
FIG. 2 is a flowchart illustrating a character recognition process which performs a grouping of similar character patterns and performs a character recognition process on every member of each group.

FIG. 2 illustrates a flowchart used to perform character recognition according to the invention. After starting, step 30 inputs an image. This can be performed using any conventional manner of obtaining an image such as a bit-mapped representation of an image including using the scanner 4, the facsimile interface 6, or by obtaining an image by a floppy disk inserted into floppy disk drive 20. Step 32 then extracts character patterns which are ordinarily connected black pixels from the input image. The extraction of character patterns is conventional and well-known in the field of optical character recognition. An exemplary process of extracting a character pattern is described in a publication entitled, "Machine Printed Character Segmentation—An Overview," by Yi Lu, appearing in The Journal of the Pattern Recognition Society, Vol. 28, No. 1, January 1995, pp. 67–80 which is incorporated herein by reference. However, any other manner of extracting character patterns may also be used.

Step 34 assembles similar character patterns into groups. Even if character patterns represent the same character, the character patterns may be slightly different due to sampling noise of the image scanner, quantization errors, or other events which may cause the image not to contain a perfect representation of a character. The inventors have found that even if two character patterns are similar to each other, a conventional character recognition process may match only one of the characters with the appropriate pattern in a recognition dictionary. However, because the character patterns have similar features, a grouping step could group these characters containing similar features and indicate that they represent the same pattern. By using a grouping step, the inventors have realized that it is beneficial to take advantage of the similarity of character patterns which repeat within an image and a more accurate and/or faster recognition process can be performed. The grouping is typically performed by first detecting similarities between the character patterns and then grouping based on the detected similarities. The grouping step 34 may be performed in accordance with the grouping described in U.S. Pat. No. 5,303,313, issued to Mark et al. and entitled "Method and Apparatus for Compression of Images", which is incorporated herein by reference. A grouping description is set forth in U.S. Pat. No. 5,303,313 beginning at the bottom of Column 8 in the section on "Symbol Matching." Other manners of grouping can be performed such as performing conventional pattern matching which detects a predetermined difference between a processed pattern and a processing pattern. If a conventional pattern matching process is used to perform the grouping, a predetermined range of the distance of each character pattern can be used as a threshold of the grouping process. For example, when a character is represented using 60×60 pixels, a range could be set to be less than or equal to 5 pixels. This range can be altered and determined by a person having ordinary skill in the art based on the teachings of this application. The decided predetermined range will vary with the requirement of the accuracy and speed of the optical character recognition system and also with the method used to detect pattern distances. A distance between patterns, such as a recognition dictionary pattern, is a well known method of indicating the closeness of two patterns. The character patterns may be compared to a reference pattern or a representative pattern based on features of each of the patterns within the group. In FIG. 2, the assembly of similar character patterns into groups in step 34 is not for the purpose of obtaining a recognition result, but it is simply to form a group of character patterns which are similar. The grouping process is not as influenced by sampling noise of the input image and is usually not as influenced by a change in font style or size within the document image.

After the character patterns are grouped, each of the groups is processed in steps 36–44. Initially, step 36 indicates that a first group is to be processed and step 38 performs a conventional character recognition process on each character pattern within this group. Each character pattern is compared to a plurality of character code nominees and a result for each character code nominee is produced, indicating the similarity of the character pattern to the corresponding pattern within a recognition dictionary. There are many known and conventional manners of performing the character recognition of step 38, any one of which may be used as long as there is some type of probability or other indication that the character pattern matches a pattern within the recognition dictionary for a character code nominee. One manner in which a numerical result can be given which indicates the likelihood of an input character pattern matching a character code nominee is to use a known distance method which indicates the amount of differences between the input character pattern and the pattern within a reference dictionary corresponding to a character code nominee. Other numerical manners of representing the similarity between an input character pattern and the character patterns of a reference dictionary for a character code nominee may also be used. A known manner of performing character recognition is disclosed in the article by Simon Kahan et al entitled, "On the Recognition of Printed Characters of Any Font and Size," from the IEEE Transactions on Pattern Analysis and Machine Intelligence, Vol. PAMI-9, No. 2, March 1987, pp. 274–288 which is incorporated herein by reference.

Next, step 40 assigns a same character to each character pattern within the group using the character recognition results obtained in step 38. For example, if the result of the character recognition process of step 38 outputs a distance between each input pattern and the possible character code nominees, the smaller the distance the more likely that input character pattern matches the reference dictionary corresponding to the character code nominee. The distances for each character code nominee are summed for each of the groups and the smallest distance results in the largest similarity. Alternatively, if the character recognition process of step 38 outputs a result where the higher likelihood of correct pattern recognition results in a higher number, then the character code nominee summations which is highest will be selected.

Figure 3:
FIG. 3 illustrates an example of how the process illustrated in FIG. 2 obtains better results than character recognition processes which do not perform a grouping.
Figure 3:
Figure 3:

In order to clearly illustrate the operation which is being performed in steps 38 and 40 and the accuracy advantages of the invention, a simple example has been created in Figure 3. FIG. 3 illustrates three patterns within a group, each of which are similar to the letter 'h'. The output from step 38 are the 12 values within the center portion of the table. In this case, the higher the number resulting from the character recognition process 38, the higher the likelihood that the character pattern matches the character code nominee. For the first row in the table, the numbers are 0.6 for 'h', 0.4 for 'b', 0.1 for 'a', and 0.2 for 'H'. As in this table a higher number indicates a higher likelihood that the character pattern matches the character code nominee, for the first character pattern, the character recognition process indicates that the character pattern most closely corresponds to 'h' as 0.6 is the highest number in the row. The double underline throughout FIG. 3 indicates the highest value of the row. For the second row of FIG. 3, the highest number for the character code nominee corresponding to the character pattern is 0.7 corresponding to 'b'. The last character pattern is most similar to 'h' because of the result 0.8. Based on ordinary character recognition alone, the first and third patterns would be considered 'h' and the second pattern would be considered 'b'. However, step 40 will assign all patterns within the group to a single character code. For example, all patterns illustrated in FIG. 3 will be assigned to the character code for the letter 'h', because the summation of the results of the character recognition process for the character code 'h' is 2.0 which is higher than 1.4 for 'b', 0.25 for 'a', etc. Accordingly, it is clearly seen that the present invention produces more accurate results in that the second pattern will be identified as 'h' due to the higher summation of the character code nominee 'h' and the higher result of 0.7 for the second pattern corresponding to the character code nominee 'b' will not produce an erroneous recognition result.

After steps 38 and 40 are performed for the first group, step 42 examines if all groups have been processed. If not, the next group is selected in step 44 and steps 38 and 40 are repeated for each of the groupings. After step 42 has determined all groups have been processed, flow proceeds to step 46.

In step 46, conventional character recognition is performed on character patterns which have not been assigned to groups. For example, if a character pattern only appears once or if there is only one member of a group, character recognition will be performed in a conventional manner for that group. Step 48 then outputs the results of the process which may be the printing, displaying, or storing of the character codes resulting from the process of FIG. 2. After step 48, the process of FIG. 2 ends.

The grouping process of FIG. 2 and as described in U.S. Pat. No. 5,303,313 groups based on the similarity between subregions of character patterns. This type of grouping will not group characters such as 'b' and 'h' into the same group, even though conventional OCR techniques might consider some 'h' patterns to be the letter 'b'.

Figure 4:
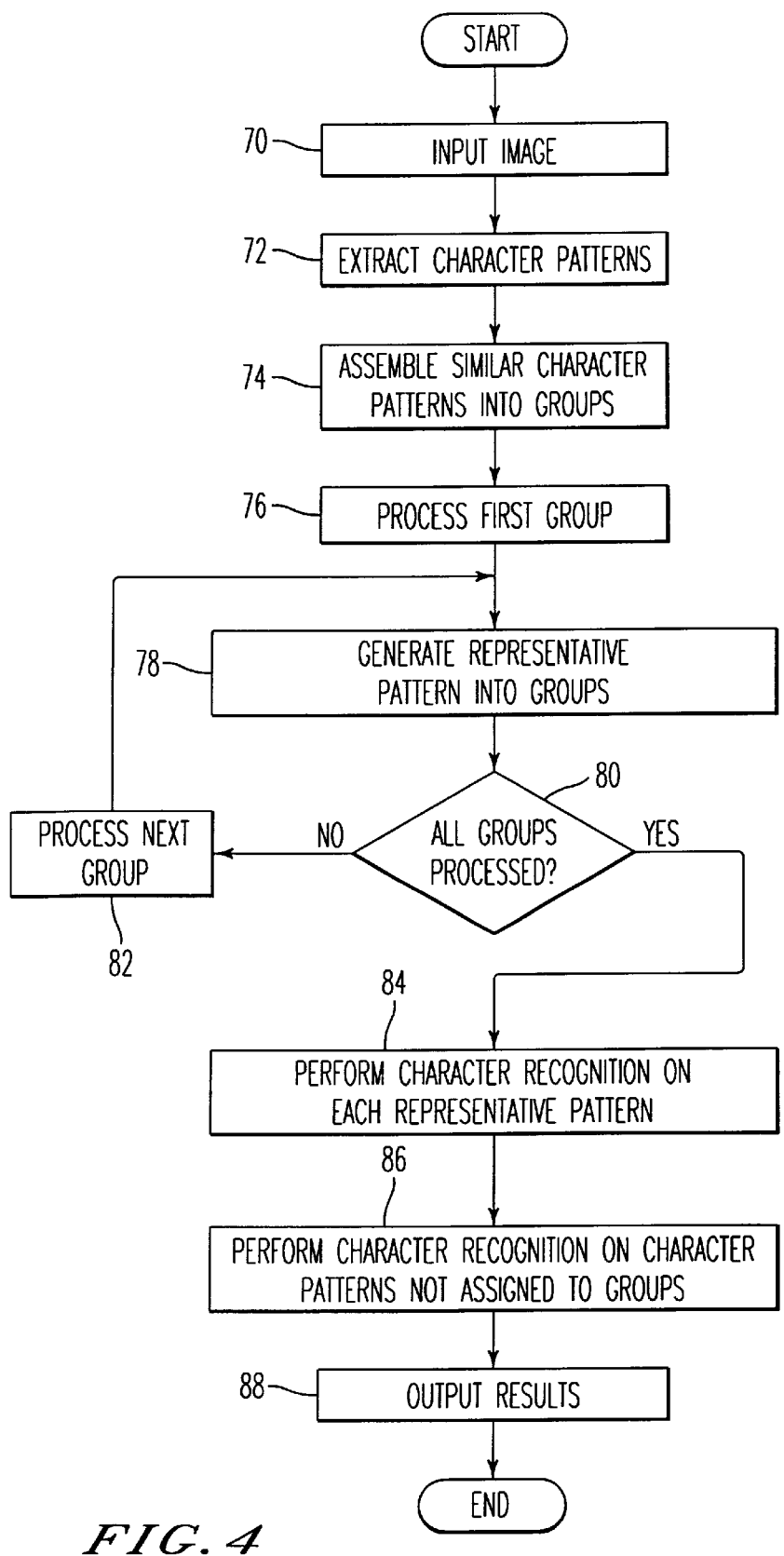
FIG. 4 is a flowchart which performs a grouping of similar character patterns, generates a representative pattern for the group, and performs a character recognition procedure on the representative pattern.

FIG. 4 is a flowchart illustrating a variation of the character recognition process of FIG. 2. In FIG. 4, steps 70–76 correspond to steps 30–36 of FIG. 2 and a description thereof is omitted for brevity. After step 76, step 78 generates a representative pattern of the group. The generation of a representative pattern, also referred to as a typical pattern involves the creation of a pattern or template using the members of the group. One manner of generating a representative pattern is illustrated in FIGS. 5A and 5B.

Figure 5A:
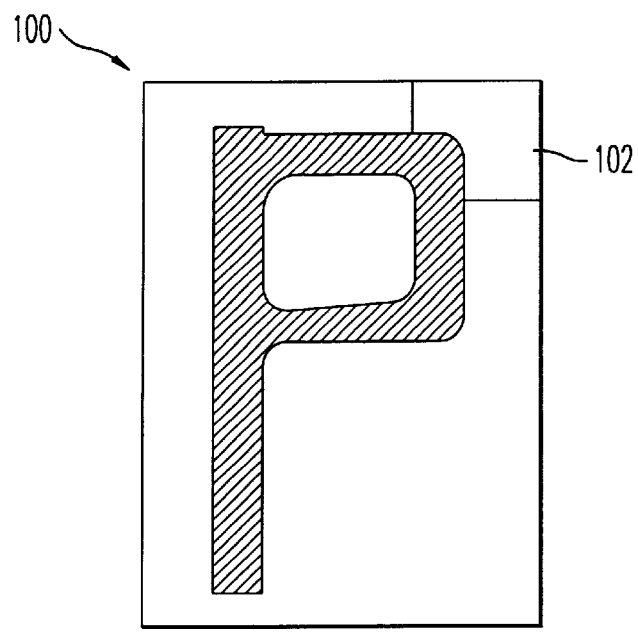
FIG. 5A illustrates a representative pattern for the letter 'P' and FIG. 5B illustrates how a portion of the representative pattern is generated.
Figure 5B:
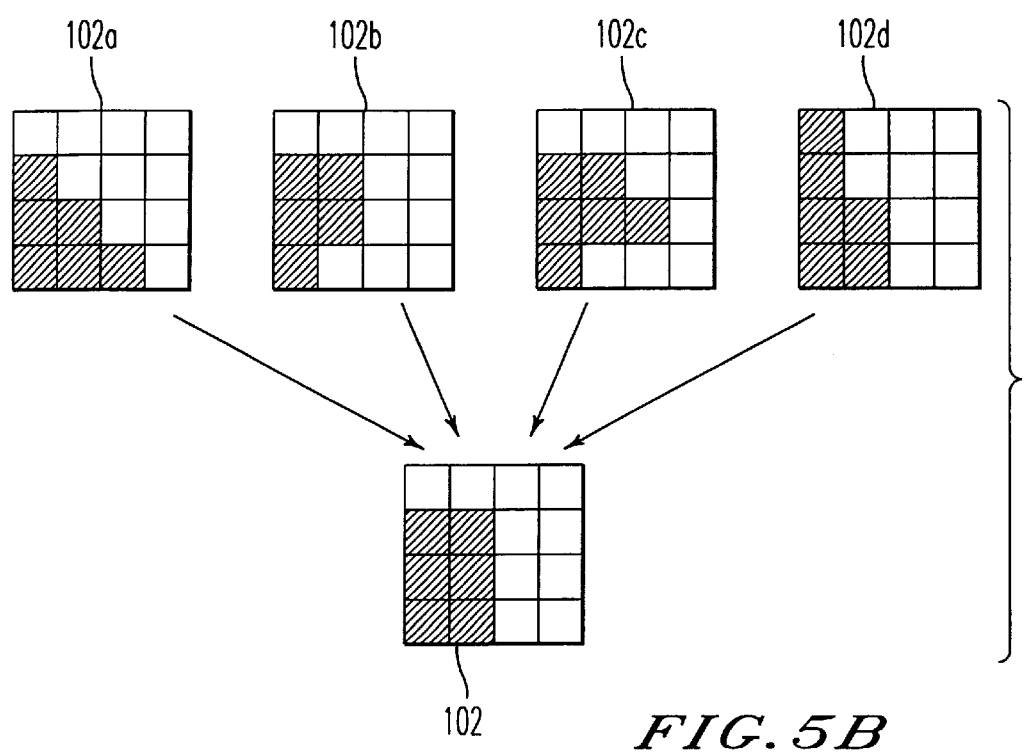

FIG. 5A illustrates a representative pattern 100 which was generated for the letter 'P'. The upper right-hand corner of this representative pattern is illustrated as 102. In FIG. 5B, there are four patterns, 102a, 102b, 102c, and 102d. In order to generate 102 from the four patterns which are members of the group, a rule has been used such that if two or more dots or pixels are dark, a corresponding portion of 102 should be dark. Other processes may be used to generate a representative pattern including the manner of generating templates as described beginning at the top of column 11 of U.S. Pat. No. 5,303,313. Further, any other manner of generating a representative pattern or a template may be used. Steps 80, 82, and 78 are performed until a representative pattern has been generated for each of the groups.

After all groups have been processed, step 84 performs character recognition on each representative pattern using conventional character recognition techniques, as described above with respect to step 38, to obtain a character code determination. Once the character recognition has been performed for the representative pattern, the character patterns of the group are assigned the character code determination of the representative pattern. In this manner, the character recognition process which is computation intensive is infrequently performed. Step 74 which assembles similar characters into pattern groups can be much less computation intensive than the character recognition process and thus a considerable computation time-savings results. Referring back to the simple example of FIG. 2, if the three character patterns illustrated each have separate character recognition performed and character recognition for each character pattern requires 150 milliseconds, 450 milliseconds will be needed to recognize the three characters. In contrast, if the grouping step 74 requires 30 milliseconds, the step of generating a representative pattern requires 5 milliseconds, and only one character recognition process needs to be performed which requires 150 milliseconds, FIG. 4 will only need approximately 185 milliseconds to perform the same recognition which conventional non-grouping optical character recognition requires 450 milliseconds. Also, the accuracy of the process illustrated in FIG. 4 is at least about the same as conventional optical character recognition techniques.

After the character recognition is performed on each representative pattern in step 84, step 86 performs character recognition on character patterns not assigned to a group and the results are output in step 88 in a similar manner as described with respect to steps 46 and 48 of FIG. 2.

In order to further improve the process illustrated in FIG. 4, it is possible to take advantage of statistical properties of the appearance of the character patterns including letters, numbers, punctuation symbols, and spaces. A known collection of American English text known as the Brown Corpus has been widely used in studying language statistics. The Brown Corpus is formed of 500 separate 2,000-word samples totalling over 1,000,000 words of natural language text representing a wide range of styles and authors. Statistics of the appearance of individual characters, groups of two characters called digrams, and groups of three characters called trigrams are illustrated in FIG. 6. A complete description of the statistical appearance of the letters, digrams and trigrams, is set forth in the publication entitled, "Text Compression" in the chapter labeled "Modeling Natural Language," pp. 77–88, from Prentice-Hall, 1990, which is incorporated herein by reference.

In FIG. 6, the solid circle represents a space. It is seen that a probability that a character from a typical English language document is a space is 17.41%, the probability that a character is the letter 'e' is 9.76%, the probability that a letter is a 't' is 7.01%, etc. Similarly, in FIG. 6 it is seen that the probability that two letters in the English language are 'e' followed by a space is 3.05%, the probability that two letters are a space followed by 't' is 2.40%, etc. Similarly, the probability that three letters are a space followed by 'th' is 1.62%. A generic term for digrams, trigrams, and tetragrams is n-gram.

Figure 7A:
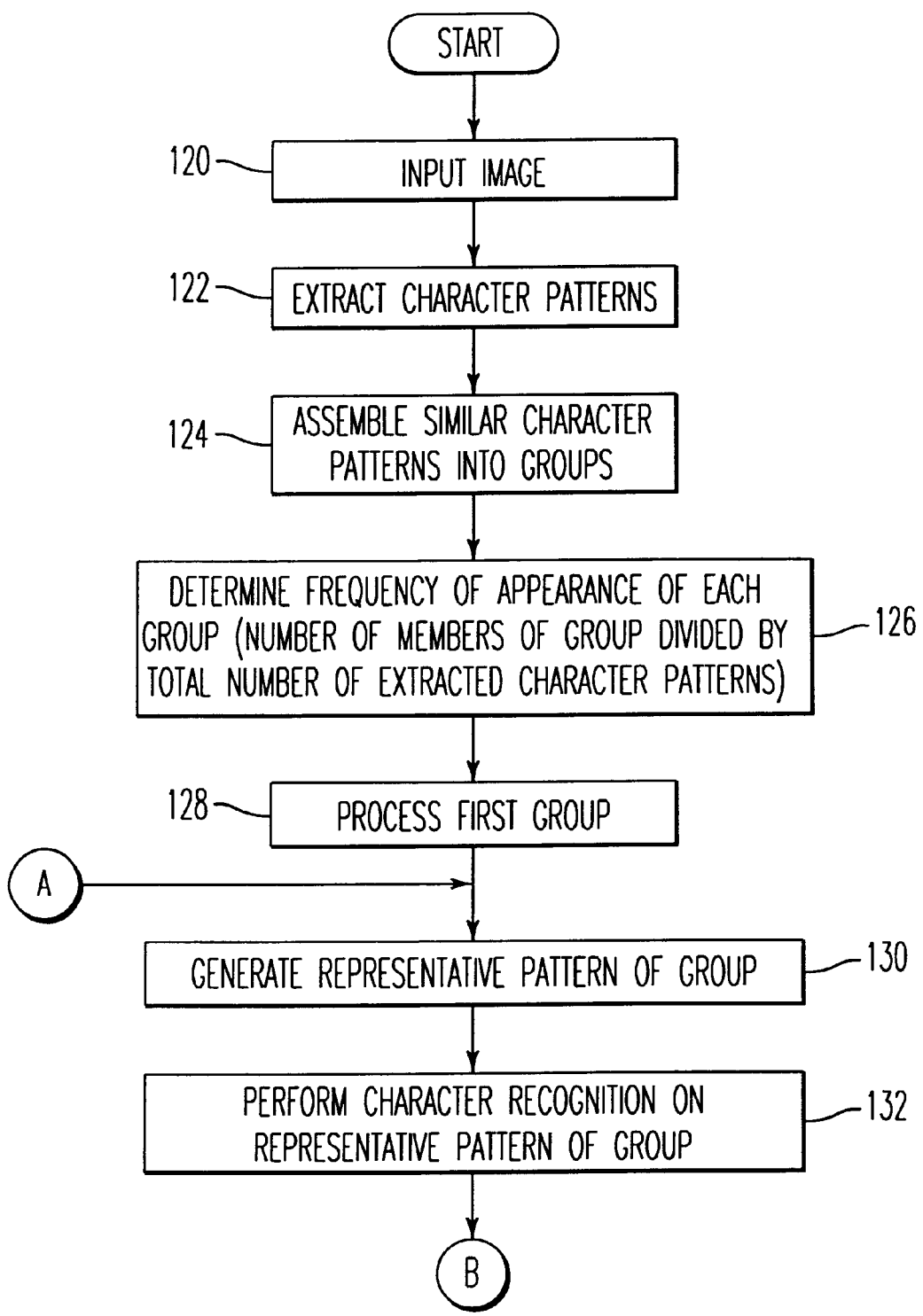
FIGS. 7A and 7B are a flowchart illustrating a character recognition process which uses a probability table containing the frequency of appearance of characters in order to obtain more accurate character recognition results.
Figure 7B:
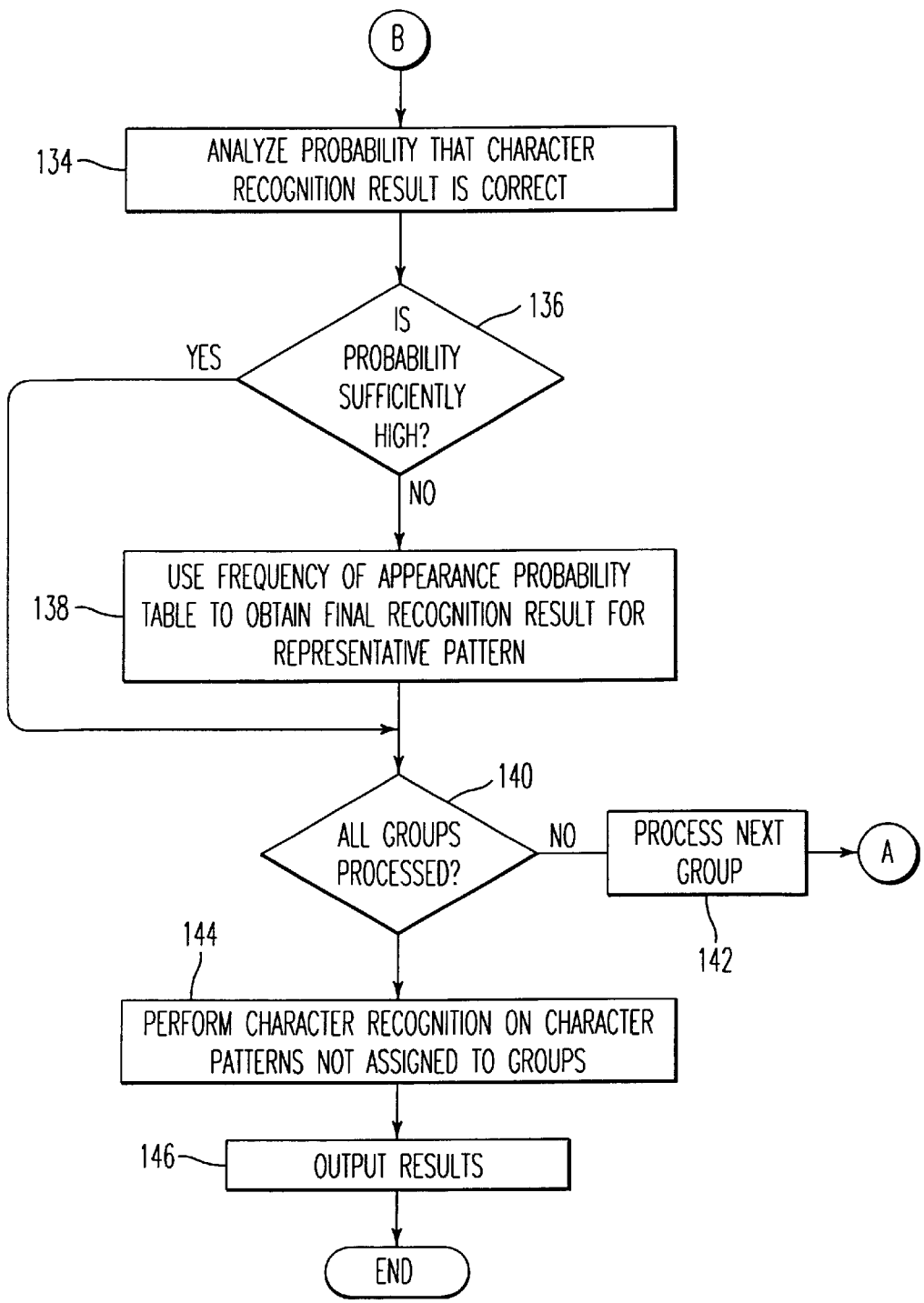

The process illustrated in the flowchart of FIGS. 7A and 7B is similar to the process illustrated in FIG. 4 but when there is not a clear recognition result for a specific representative pattern of a group, the frequency of appearance of individual characters is used. Similarly, in the flowchart illustrated in FIGS. 8A and 8B, when there is no clear answer for the character recognition process, neighboring characters along with the character in question are examined and the probability of occurrence of an n-gram is used to determine the most likely recognition result.

Turning now to the flowchart illustrated in FIGS. 7A and 7B, steps 120, 122 and 124 correspond to steps 70, 72 and 74, respectively, of FIG. 4 and a description is omitted for brevity. After step 124, step 126 determines the frequency of appearance of each group. This is determined by calculating the number of members of the group divided by the total number of extracted character patterns of the image or document. Step 128 indicates that the first group is to be processed and step 130 generates the representative pattern of this group as explained with respect to step 78 of FIG. 4. Next, step 132 performs character recognition on the representative pattern of the group as explained with respect to step 84 of FIG. 4. Flow then proceeds to process B illustrated in FIG. 7B.

In FIG. 7B, the probability that the character recognition result is correct is analyzed in step 134. As an example of this type of analysis, the row of the second pattern in FIG. 3 has a result of 0.6 for the letter 'h' and 0.7 for 'b'. Based on experimental results, a predetermined threshold indicating the similarity of character code nominees is set. For example, using the numbers illustrated in FIG. 3, if the difference between the score of the highest character code nominee (0.7) and the next highest character code nominee (0.6) is less than a predetermined threshold such as 0.11 (which is the case for the second row of FIG. 3), then step 136 determines that the probability of an accurate result is not sufficiently high and additional processing is performed in step 138. As an alternative to the example of FIG. 3, a distance or other method may be used in step 134. Step 138 uses a frequency of appearance probability table such as the table illustrated in FIG. 6 to obtain the final recognition result for the representative pattern of the group. The most desirable predetermined threshold may be determined by one of ordinary skill in the art based on speed and accuracy requirements and the specific recognition algorithm being used. Step 138 is performed by comparing the frequency of appearance determined in step 126 with the frequency of appearances in a table, such as the table illustrated in FIG. 6, of the highest character code nominees. For example, if the two possible character code nominees for a pattern are 'h' and 'b', and the pattern in question appears 4% of the time, the predetermined probability table such as illustrated in FIG. 6 shows that the letter 'h' appears 4.15% of the time and the letter 'b' appears 1.10% of the time and since 4% is closer to 4.15% which corresponds to 'h' than to 1.10% which corresponds to 'b', step 138 will determine that the final recognition result should be 'h'.

In addition to simply using the closer percentage to a probability table such as FIG. 6 when the character code nominees are within a predetermined threshold of each other, it is possible to use a combination of both the probability of the character code nominee being correct and a character code table. For example, for the second row of FIG. 3, extra weight could be given to the character code nominee 'b' because 0.7 is larger than 0.6 which corresponds to 'h' and therefore 'b' has a higher probability of being correct. As an example, the character recognition results of the character code nominee may be made of a sum of a certain percentage of the decision made in step 132 and a certain percentage of the decision determined using the probability table.

If step 136 determines that the probability of a correct result from the character recognition is sufficiently high (e.g., the character code nominee has a value which is above a predetermined threshold), step 138 does not need to be performed. Next, step 140 examines if all groups are processed and if they are not, the next group is set to be processed in step 142 and flow proceeds to process A illustrated in FIG. 7A to return to step 130. If all groups have been processed, steps 144 and 146 are performed in a manner which corresponds to steps 86 and 88 of FIG. 4.

Figure 8A:
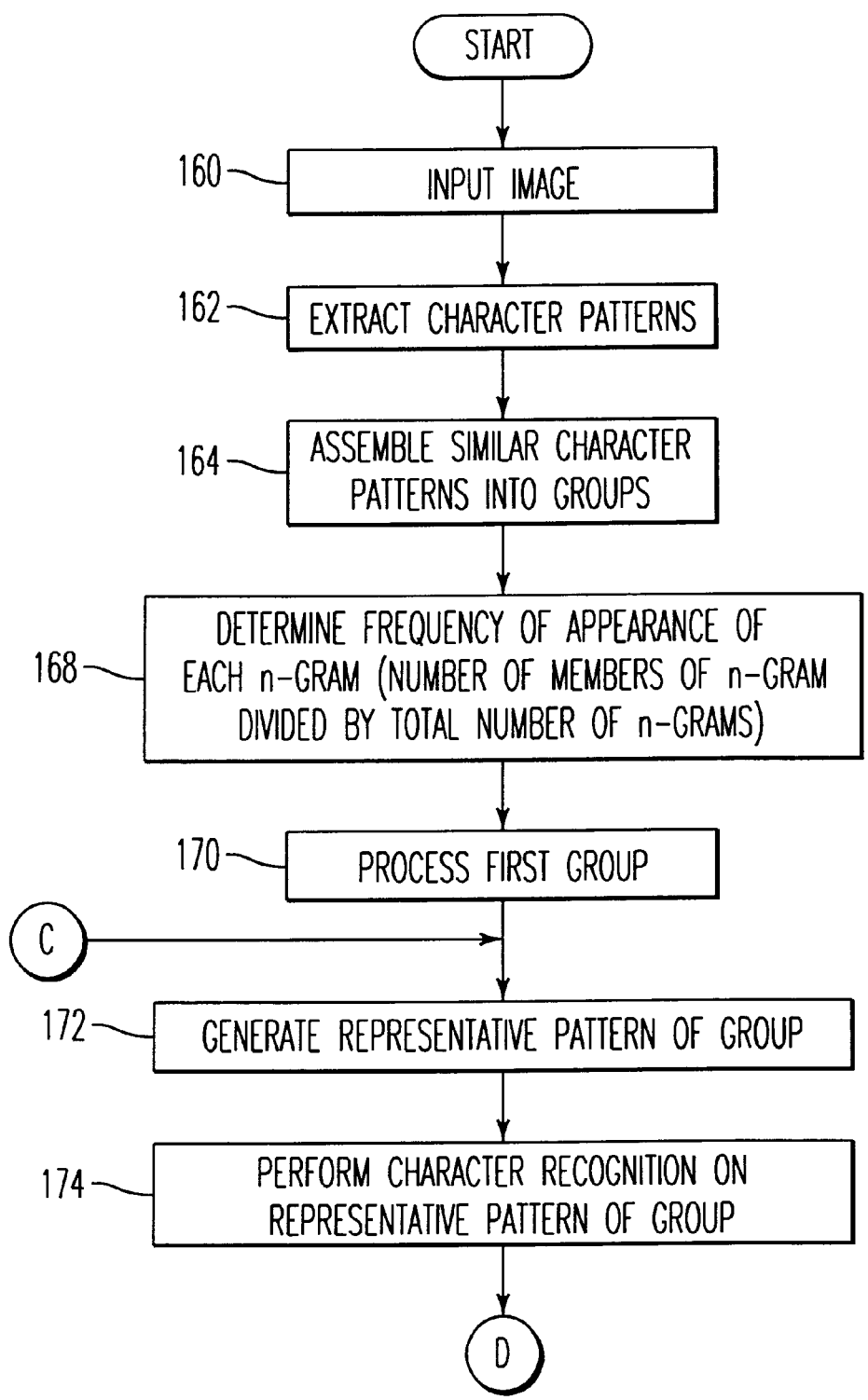
FIGS. 8A and 8B are a flowchart illustrating a process using the probability of appearance of n-grams in order to produce more accurate recognition results.
Figure 8B:
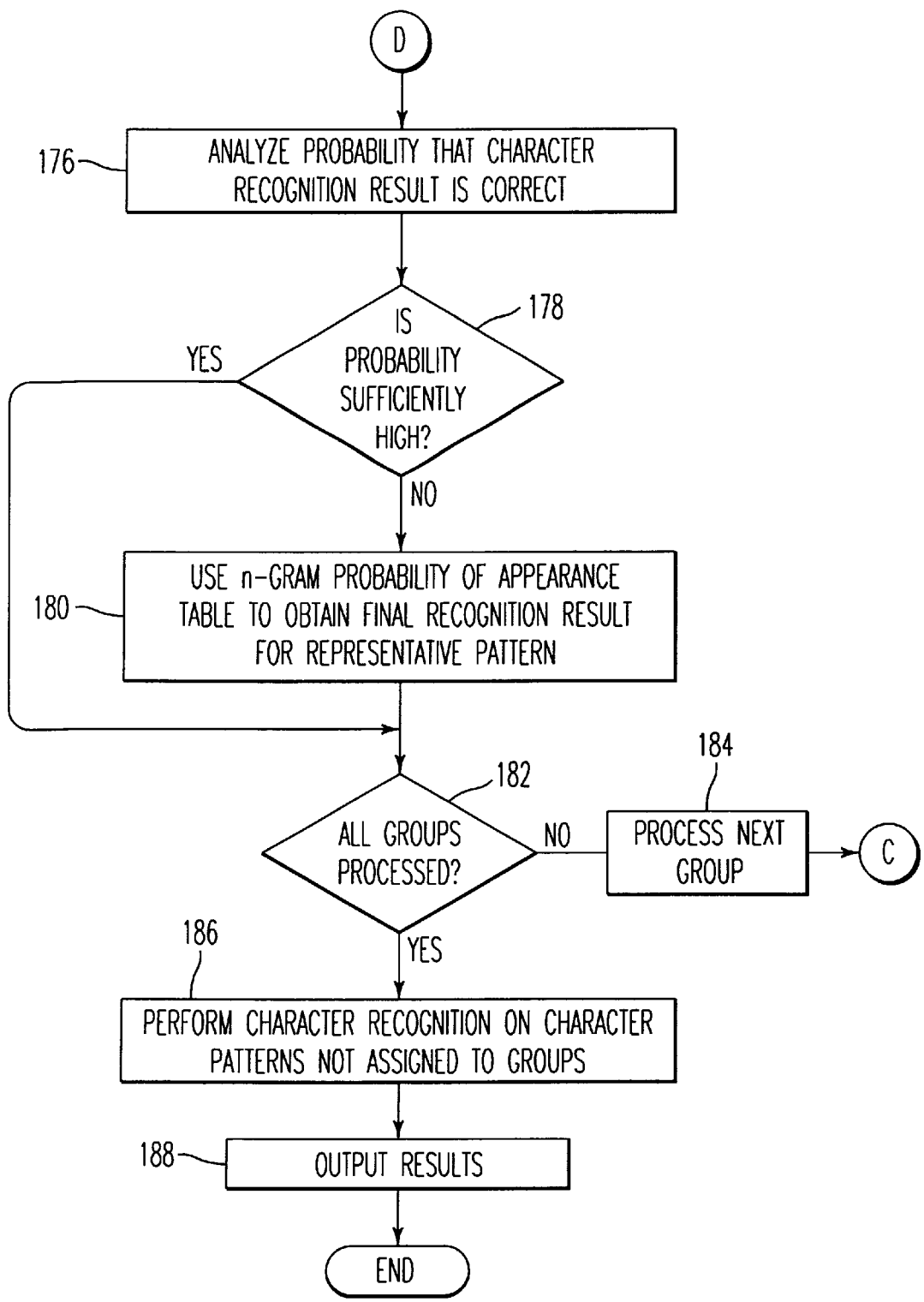

As an alternative to using individual character probabilities as in FIGS. 7A and 7B, the probability of occurrence of an n-gram may be used as illustrated in FIGS. 8A and 8B. The use of a digram probability may be quicker than the use of a trigram probability and other larger n-grams due to a larger amount of information which will have to be processed for the higher order n-grams. FIGS. 8A and 8B are similar to FIGS. 7A and 7B except for steps 168 and 180. In step 168, the frequency of appearance of each n-gram is determined by dividing the number of members of an n-gram by the total number of n-grams in the image.

FIG. 9 illustrates a manner in which the frequency of appearance of each digram may be calculated. For example, the digram $S_1S_2$ corresponds to 'ab'. It is seen that the character pattern line of the image in question is 'abcdeabfcdghij'. This character pattern lines constitutes the symbol series. Next, the symbol pairs are determined in order to form the digrams. For example, the digram $S_1S_2$ corresponds to the digram 'ab' which appears twice in the character pattern line in question. Therefore, the number of members of the digram 'ab' is two in FIG. 9. The frequency is determined by dividing the number of times 'ab' appear by the total number of digrams in the character pattern line of FIG. 9.

The other difference between FIGS. 7A and 7B and the process of FIGS. 8A and 8B is that step 180 uses the n-gram probability of appearance table to obtain a final recognition result for the representative pattern. For example, if the digram in question is 'ab' and it is not clear if the 'b' should correspond to 'b' or 'h', the digram appearance table illustrated in FIG. 6 will be used in the same manner as the character probability portion of FIG. 6 is used to determine whether $S_1S_2$ corresponds to the digram 'ab' or the digram 'ah'.

This invention may be conveniently implemented using a conventional general purpose digital computer program according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

Obviously, numerous modifications and variations of the present invention are possible in light of the above teachings. For example, various features in the different flowcharts illustrated in the drawings may be combined in any desired manner. Further, specific aspects of the embodiments may be used alone such as the use of the probability information in FIG. 6 may be used without performing a grouping or may be used with the process illustrated in FIG. 2. It is therefore to be understood that within the scope of the appended claims, the invention may be practiced otherwise than as specifically described herein.

What is claimed as new and is desired to be secured by Letters Patent of the United States is:

1. A character recognition method for use with an image of a document, comprising the steps of:

extracting character patterns from the image;
   detecting similarities between the character patterns;
   grouping the character patterns into groups using the detecting similarities;
   determining for each of said groups a corresponding character code using a character recognition process, the corresponding character code corresponding to features of the members of a corresponding group, after the step of grouping; and
   assigning to each character pattern of each of said groups the character code which corresponds to the group of the character pattern,
   wherein each character pattern of one of the groups is assigned a same character code, and
   wherein the same character code is a recognized character code.

2. A method according to claim 1, wherein said determining step includes:

determining, on an individual character pattern basis, a character code for each of said character patterns in said groups; and
   assigning, on a group basis, one of said character codes of each group as the corresponding character code of the group.

3. A method according to claim 2, wherein said step of assigning on a group basis includes:

determining, on a group basis, the corresponding character code for each of said groups which has a highest probability of being a correct character code of the character patterns within the groups and assigning to each of said groups the corresponding character code thereof.

4. A method according to claim 3, wherein said step of determining on a group basis includes:

determining the corresponding character code which has the highest probability of being the correct character code by determining a distance between a reference pattern in a dictionary and each of the character patterns, on a group basis, and summing up the distances for each member of the group to character patterns of a plurality of character code nominees, on a group basis.

5. A method according to claim 1, wherein said determining step includes:

generating, on a group basis, a representative pattern corresponding to each of said groups; and
   performing a character recognition process on each of said representative patterns to determine a character code for each of said representative patterns used as the corresponding character code of the group of the representative pattern.

6. A method according to claim 5, wherein said step of performing a character recognition process includes:

determining the character code for each of said representative patterns based on statistical properties of typical documents.

7. A method according to claim 6, wherein said step of performing a character recognition process includes:

determining if the probability of different character codes correspond to ones of the representative patterns are within a predetermined threshold; and
   determining the character codes using statistical properties of typical documents when the representative patterns are within a predetermined threshold.

8. A method according to claim 7, wherein said step of determining the character codes using statistical probabilities includes:

determining the character codes using a table containing a probability of appearance of characters in the typical documents.

9. A method according to claim 8, wherein said step of determining the character codes using statistical properties includes:

comparing a frequency of appearance in said image of a character code nominee with a frequency of appearance of said character code nominee in said table.

10. A method according to claim 7, wherein said step of determining the character codes using statistical properties includes:

determining the character codes using a table containing a probability of appearance of consecutive characters in the typical documents.

11. A character recognition apparatus for use with an image of a document, comprising:

means for extracting character patterns from the image;

means for detecting similarities between the character patterns;

means for grouping the character patterns into groups using the detected similarities;

means for determining for each of said groups a corresponding character code using a character recognition process, the corresponding character code corresponding to features of the members of a corresponding group, after grouping the character patterns into groups; and means for assigning to each character pattern of each of said groups the character code which corresponds to the groups of the character patterns, wherein each character pattern of one of the groups is assigned a same character code, and wherein the same character code is a recognized character code.

12. An apparatus according to claim 11, wherein said means for determining includes:

means for determining, on an individual character pattern basis, a character code for each of said character patterns in said groups; and means for assigning, on a group basis, one of said character codes of each group as the corresponding character code of the group.

13. An apparatus according to claim 12, wherein said means for assigning on a group basis includes:

means for determining, on a group basis, the corresponding character code for each of said groups which has a highest probability of being a correct character code of the character patterns within the groups and assigning to each of said groups the corresponding character code thereof.

14. An apparatus according to claim 13, wherein said means for determining on a group basis includes:

means for determining the corresponding character code which has the highest probability of being the correct character code by determining a distance between a reference pattern in a dictionary and each of the character patterns, on a group basis and summing up the distances for each member of the group to character patterns of a plurality of character code nominees, on a group basis.

15. An apparatus according to claim 11, wherein said means for determining includes:

means for generating, on a group basis, a representative pattern corresponding to each of said groups; and means for performing a character recognition process on each of said representative patterns to determine a character code for each of said representative patterns used as the corresponding character code of the group of the representative pattern.

16. An apparatus according to claim 15, wherein said means for performing a character recognition includes:

means for determining the character code for each of said representative patterns based on statistical properties of typical documents.

17. An apparatus according to claim 16, wherein said means for performing a character recognition process includes:

means for determining if the probability of different character codes correspond to ones of the representative patterns are within a predetermined threshold; and means for determining the character codes using statistical properties of typical documents when the representative patterns are within a predetermined threshold.

18. An apparatus according to claim 17, wherein said means for determining the character codes using statistical properties includes:

means for determining the character codes uses a table containing a probability of appearance of characters in the typical documents.

19. An apparatus according to claim 18, wherein said means for determining the character codes using statistical properties includes:

means for comparing a frequency of appearance in said image of a character code nominee with a frequency of appearance of said character code nominee in said table.

20. An apparatus according to claim 17, wherein said means for determining the character codes using statistical properties includes:

determining the character codes using a table containing a probability of appearance of consecutive characters in the typical documents.

21. A computer program product having a computer readable medium having computer program logic recorded thereon for preforming a character recognition process on an image of a document, comprising:

means for extracting character patterns from the image;

means for detecting similarities between the character patterns;

means for grouping the character patterns into groups using the detected similarities;

means for determining for each of said groups a corresponding character code using a character recognition process, the corresponding character code corresponding to features of the members of a corresponding group, after grouping the character patterns into groups; and means for assigning to each character pattern of each of said groups the character code which corresponds to the groups of the character patterns, wherein each character pattern of one of the groups is assigned a same character code, and wherein the same character code is a recognized character code.

22. A computer program product according to claim 21, wherein said means for determining includes:

means for determining, on an individual character pattern basis, a character code for each of said character patterns in said groups; and means for assigning, on a group basis, one of said character codes of each group as the corresponding character code of the group.

23. A computer program product according to claim 22, wherein said means for assigning on a group basis includes:

means for determining, on a group basis, the corresponding character code for each of said groups which has a highest probability of being a correct character code of the character patterns within the groups and assigning to each of said groups the corresponding character code thereof.

24. A computer program product according to claim 23, wherein said means for determining on a group basis includes:

means for determining the corresponding character code which has the highest probability of being the correct character code by determining a distance between a reference pattern in a dictionary and each of the character patterns, on a group basis and summing up the distances for each member of the group to character patterns of a plurality of character code nominees, on a group basis.

25. A computer program product according to claim 21, wherein said means for determining includes:

means for generating, on a group basis, a representative pattern corresponding to each of said groups; and means for performing a character recognition process on each of said representative patterns to determine a character code for each of said representative patterns used as the corresponding character code of the group of the representative pattern.

* * * * *